(12) United States Patent
Thevenon et al.

(10) Patent No.: US 9,030,357 B2
(45) Date of Patent: May 12, 2015

(54) METHOD FOR IDENTIFYING TRANSMITTERS BY A TERMINAL IN A SINGLE-FREQUENCY NETWORK

(75) Inventors: Paul Thevenon, Toulouse (FR); Stéphane Corazza, Toulouse (FR); Christophe Macabiau, Montauban (FR); Olivier Julien, Toulouse (FR); Lionel Ries, Viviers les Montagnes (FR); Michel Bousquet, Deyme (FR)

(73) Assignees: Centre National d'Etudes Spatiales (CNES), Paris-Cedex (FR); Thales, Courbevoie (FR)

( * ) Notice: Subject to any disclaimer, the term of this patent is extended or adjusted under 35 U.S.C. 154(b) by 621 days.

(21) Appl. No.: 13/268,540

(22) Filed: Oct. 7, 2011

(65) Prior Publication Data

US 2012/0262341 A1    Oct. 18, 2012

(30) Foreign Application Priority Data

Oct. 8, 2010    (FR) ...................................... 1003997

(51) Int. Cl.
*G01S 5/02*    (2010.01)
*G01S 1/32*    (2006.01)
*G01S 19/10*    (2010.01)

(52) U.S. Cl.
CPC ............. *G01S 5/0278* (2013.01); *G01S 5/0226* (2013.01); *G01S 1/32* (2013.01); *G01S 19/10* (2013.01)

(58) Field of Classification Search
CPC ........ G01S 1/20; G01S 5/0226; G01S 5/0278
USPC .................................. 342/387, 451, 463, 464
See application file for complete search history.

(56) References Cited

U.S. PATENT DOCUMENTS

| 7,715,850 | B2 * | 5/2010 | Lin ............................ 455/456.1 |
| 2005/0266855 | A1 * | 12/2005 | Zeng et al. ................. 455/456.1 |

(Continued)

OTHER PUBLICATIONS

Thevenon, P., Julien, O., Macabiau, C., Serant, D., Corazza, S., Bousquet, M., Ries, L., Grelier, T., "Pseudo-range Measurements using OFDM Channel Estimation," Proceedings of the 22nd International Technical Meeting of the Satellite Division of the Institute of Navigation (ION GNSS 2009), Savannah, GA, Sep. 2009, pp. 481-493.*

(Continued)

*Primary Examiner* — Gregory C Issing
(74) *Attorney, Agent, or Firm* — Baker & Hostetler LLP

(57) ABSTRACT

A method for identifying transmitters by a terminal in a single-frequency network comprising a plurality of transmitters. The transmitters are synchronized and transmit with an artificial delay $\tau_i$, specific to each transmitter. The method comprises at least one step of acquiring the approximate position of the terminal $\hat{p}$, the position $p_i$ of a list of transmitters {Tx} in the vicinity of the terminal and the delays $\tau_i$ associated with them, a step of measuring pseudo-distances $\rho_i$ between the transmitters and the terminal and a step of associating the measurements $\rho_i$ with the transmitters of known positions $p_i$ by minimizing a cost function, said cost function $v(\rho_i, \hat{p}, \sigma)$ corresponding to the norm of the error between the measurements $\rho_i$ and a model of measurements of the pseudo-distances applied to a permutation of the position of the transmitters $\sigma$.

11 Claims, 1 Drawing Sheet

(56) References Cited

U.S. PATENT DOCUMENTS

2009/0070847 A1 3/2009 Furman et al.
2010/0081451 A1 4/2010 Mueck et al.

OTHER PUBLICATIONS

Mattson, A. "Single Frequency Networks in DTV," IEEE Trans. on Broadcasting, vol. 51, No. 4, Dec. 2005. pp. 413-422.*

Wang, X. et al, "A New Position Location System Using DTV Transmitter Identification Watermark Signals," EURASIP Journal on Applied Signal Processing, vol. 2006, article ID 42737, pp. 1-11.*

Thevenon P. et al.: "Positioning principles with a mobile TV system using DVB-SH signals and a Single Frequency Network," Digital Signal Processing, 2009 16th International Conference on, IEEE, Piscataway, NJ, USA, Jul. 5, 2009, pp. 1-8.

* cited by examiner

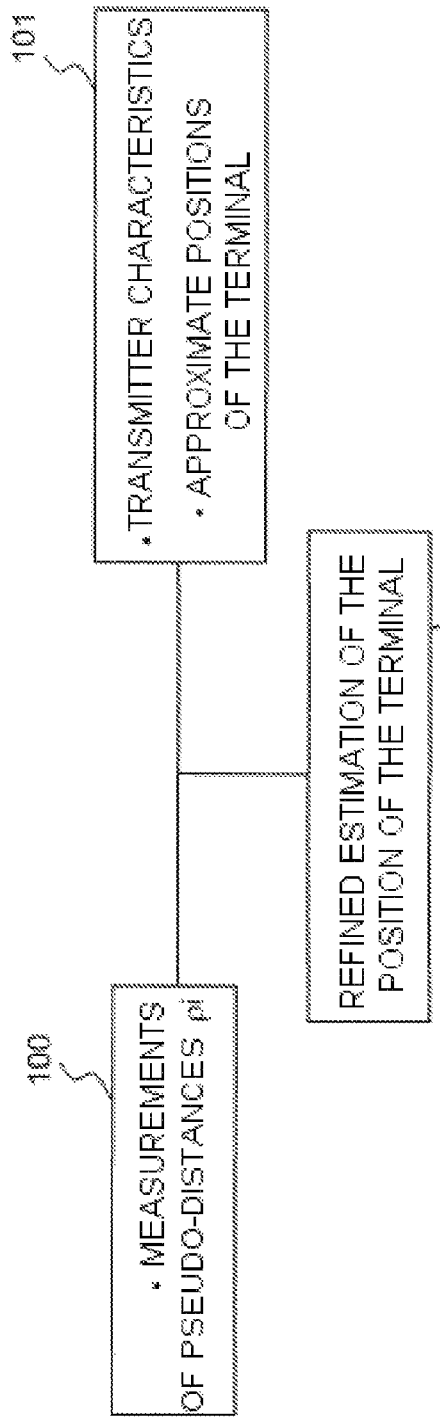
FIG.1
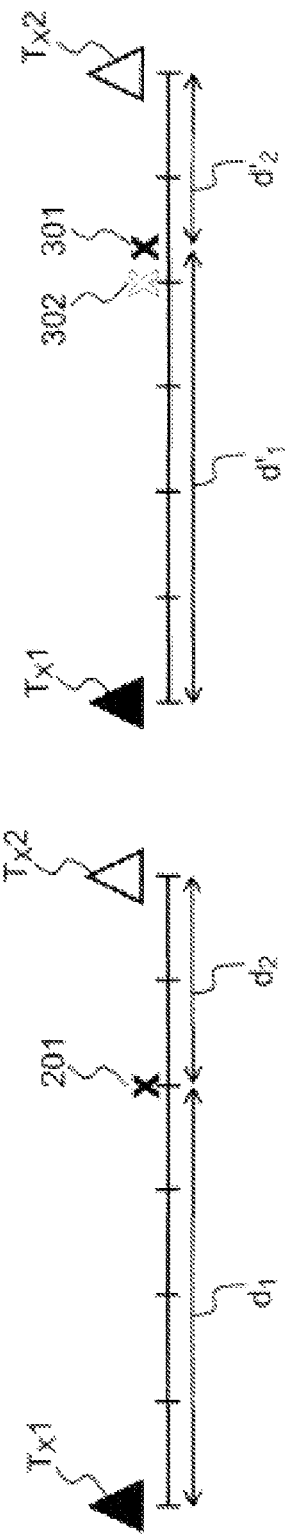
FIG.2
FIG.3

METHOD FOR IDENTIFYING TRANSMITTERS BY A TERMINAL IN A SINGLE-FREQUENCY NETWORK

CROSS-REFERENCE TO RELATED APPLICATIONS

This application claims priority to foreign French patent application No. FR 10 03997, filed on Oct. 8, 2010, the disclosure of which is incorporated by reference in its entirety.

FIELD OF THE INVENTION

The invention relates to a method for identifying transmitters by a terminal in a single-frequency network. It applies notably to the field of geo-location.

BACKGROUND OF THE DISCLOSED SUBJECT MATTER

Mobile telecommunication terminals, such as mobile telephones or portable computers, are frequently used for the implementation of applications requiring precise location information. Thus, it is commonplace for these terminals to include means enabling them to estimate their position as accurately as possible. Satellite geo-location systems are particularly used. One example that can be cited is the GPS system, the acronym GPS standing for "Global Positioning System". For a satellite geo-location system to function correctly, a sufficient number of satellites must be visible to the terminal. The choice of the number and the position of the satellites in the constellation of such a system makes it possible to satisfy this constraint. There are, nevertheless, situations in which the terminal cannot receive signals from a sufficient number of satellites. Such is, for example, the case in urban centers including large buildings preventing the satellites from being visible to the terminal or when the terminal is in partially or totally covered areas.

Other geo-location techniques can be used and rely notably on the characteristics of the waveforms and of the mobile radio system access networks such as GSM or UMTS, or else relying on wireless telecommunication systems such as Wifi or WiMax. However, the estimation accuracy is poorer than that obtained by the existing satellite geo-location techniques.

The single-frequency networks, also called SFN networks, are more rarely used in the geo-location context. An SFN network is a network comprising a plurality of transmitters and receivers. In this type of network, each transmitter transmits the same signal in a synchronized manner and on one and the same carrier frequency. In the absence of multiple paths, a receiver receives several replicas of the same signal originating from a number of transmitters. The various replicas are assigned an attenuation and a delay both of which are different, said attenuation and said delay depending notably on the distance between the receiving terminal and each of the transmitters. These characteristics of the SFN networks make it difficult for a receiving terminal to identify the origin of a replica of the signal, that is to say, to identify the transmitter. Locating the terminal by using the signals transmitted by the transmitters of a network is in principle possible provided it is possible to locate and identify said transmitters.

Digital tattooing is a known technique which notably enables the terminals to identify the transmitters of an SFN network. This technique is often referred to as "watermarking". The principle of this technique is that a signal identifying the transmitter is superposed on the signal containing the application data intended for the user of the receiving terminal. The signal including these user data is hereinafter in the description called the useful signal. Said user data correspond, for example, to video streams associated with television channels. The identification signal is usually superposed on the useful signal with a very low relative power, which does not disturb the reception of the user data. However, the identification signal is scrambled when approaching another transmitter. This corresponds to the phenomenon that is well known to those skilled in the art called "near-far effect". In this case, only the nearest transmitters can be identified. As explained previously, to estimate the position of a terminal, it is necessary to identify as many transmitters as possible.

SUMMARY OF THE DISCLOSED SUBJECT MATTER

One aim of the invention is notably to overcome the above-mentioned drawbacks.

To this end, the subject of the invention is a method for identifying transmitters by a terminal in a single-frequency network comprising a plurality of transmitters, said transmitters being synchronized and transmitting with an artificial delay $\tau_i$, specific to each transmitter. The method comprises at least:

a step of acquiring the approximate position of the terminal $\hat{p}$, the position $p_i$ of a list of transmitters $\{Tx\}$ in the vicinity of the terminal and the delays $\tau_i$ associated with them;

a step of measuring pseudo-distances $\rho_i$ between the transmitters and the terminal;

a step of associating the measurements $\rho_i$ with the transmitters of known positions $p_i$ by minimizing a cost function, said cost function $v(\rho_i,\hat{p},\sigma)$ corresponding to the norm of the error between the measurements $\rho_i$ and a model of measurements of the pseudo-distances applied to a permutation of the position of the transmitters $\sigma$.

According to one aspect of the invention, the method comprises a step of estimating the refined position of the terminal by using the positions of the transmitters and the pseudo-measurements associated with them.

The positions $p_i$ and the artificial delays $\tau_i$ of the transmitters can be stored in a database located in the terminal.

Alternatively, the positions $p_i$ and the artificial delays $\tau_i$ of the transmitters can be transmitted to the terminal by using telecommunication means.

The acquisition of the approximate position $\hat{p}$ of the terminal is, for example, the result of estimations performed on mobile radio systems such as GSM or UMTS.

It is also possible for the approximate position of the receiving terminal to correspond to a position acquired by GPS.

The cost function corresponds, for example, to the following expression:

$$v(p_i, \hat{p}, \sigma) = \sum_{i=1}^{card(\sigma)} \left(\rho_i - \sqrt{(\hat{x} - x_i)^2 + (\hat{y} - y_i)^2} - c \times \tau_i\right)^2.$$

in which:
$\rho_i$ represents the ith measurement of pseudo-distances;
$\hat{p}=[\hat{x},\hat{y}]$ represents the approximate position of the terminal;
$\sigma$ represents all the possible combinations of the transmitters in the list $\{Tx\}$;
card($\sigma$) represents the cardinal of $\sigma$;

c is a constant representing the speed of light;
$\tau_i$ corresponds to the artificial delay associated with the ith transmitter.

According to one aspect of the invention, the best transmitters-measurements combination $\hat{\sigma}$ is determined by using the expression:

$$\hat{\sigma} = \arg\min_{\sigma}[v(p, \hat{p}, \sigma)]$$

in which:

$$\arg\min_k( \ )$$

is a function indicating that the search for the minimum is done only on the variable k.

Also the subject of the invention is a telecommunication terminal comprising means for receiving signals transmitted by the transmitters of a single-frequency network. This terminal comprises means for implementing the method for identifying transmitters as described previously.

BRIEF DESCRIPTION OF THE DRAWINGS

Other features and advantages of the invention will become apparent from the following description given as an illustrative and nonlimiting example, in light of the appended drawings in which:

FIG. 1 illustrates the principle of identifying transmitters and of geo-locating a terminal in a single-frequency network according to the invention;

FIG. 2 gives a simple example of application of the method according to the invention when there are no estimation errors;

FIG. 3 gives a simple example of application of the method according to the invention in the presence of estimation errors.

DETAILED DESCRIPTION

FIG. 1 illustrates the principle of identifying transmitters and of geo-locating a terminal in a single-frequency network according to the invention.

In order to prevent two signal replicas from one and the same transmitter from arriving at the same time at the receiving terminal, the method according to the invention can be implemented for an SFN network in which the transmitters are synchronized, but in which each transmitter transmits the signal with a different delay, a predefined delay value being specific to each of said transmitters. These delays are called delays or artificial delays hereinafter in the description. The concept of artificial delays was introduced in the patent application FR 1001868.

In order to estimate its position, a terminal carries out measurements of pseudo-distances $\rho_i$ based on signals received from the different transmitters of the single-frequency network. These measured pseudo-distances can be described using the following expression:

$$\rho_i = h(p, p_i, \tau_i) + n_i \text{ with } i \in \{Tx\} \quad (1)$$

in which:
p=[x,y] corresponds to the exact position of the receiving terminal;
$p_i=[x_i,y_i]$ corresponds to the position of the ith transmitter;
$\tau_i$ corresponds to the artificial delay associated with the ith transmitter;
$n_i$ corresponds to the noise affecting the pseudo-distance measurement;
$h(p,p_i,\tau_i)=\sqrt{(x-x_i)^2+(y-y_i)^2}+c\times\tau_i$ is the pseudo-distance modeling function;
{Tx} corresponds to the list of the transmitters for which a pseudo-distance is measured.

On the basis of only the pseudo-distance measurements $\rho_i$, it is not possible to associate the received signals with the different transmitters. In other words, it is not possible to identify which transmitter has transmitted a signal replica received by the receiving terminal.

In order to identify the transmitters, the method uses, on the one hand, the pseudo-distance measurements $\rho_i$ 100 and, on the other hand, assistance data 101 making it possible to identify the configuration of transmitters corresponding to the collection of measured pseudo-distances. In practice, by introducing artificial delays, a single transmitters/pseudo-distances combination is possible for a given position of the terminal. Each pseudo-distance measurement is thus unambiguously associated with a transmitter. It is then possible to accurately locate the terminal by a simple calculation well known to those skilled in the art, the positions of the transmitters and the pseudo-distances associated with them being known to the terminal.

Several types of assistance data 101 are used. Thus, an approximate position of the receiver and the position of the transmitters in the vicinity of the terminal are used by the method. These assistance data can be supplied in different ways. As examples, the positions and the artificial delays of the transmitters of the single-frequency network can be stored in a database accessible to the terminal or else transmitted to it by radio channel. With respect to the approximate position of the receiving terminal, this can be the result of estimations carried out in GSM or in UMTS mode. This can also be obtained by using the last position estimated by a GPS module before the latter is no longer capable of functioning correctly, for example when it does not have a sufficient number of satellite signals to perform its estimations.

To sum up, a receiver then has a set of pseudo-distance measurements 100. It knows its approximate position and the characteristics of the transmitters which are in its vicinity 101, that is to say, their position and the artificial delay values associated with them.

On the basis of these data, for each combination of possible associations between the transmitters and the pseudo-distance measurements, the receiver determines a cost, this cost being obtained using a cost function $v( \ )$.

The receiver then selects one of the possible combinations of transmitters. For this, the combination of transmitters associated with the minimum cost is selected.

The cost function is equal, for example, to the norm of the error between the pseudo-distance measurements and a model of measurements applied to a permutation of the position of the transmitters.

A cost function that can be used in the context of the invention is given by the following expression:

$$v(p_i, \hat{p}, \sigma) = \sum_{i=1}^{card(T_x)} \left(\rho_i - \sqrt{(\hat{x}-x_{\sigma(i)})^2 + (\hat{y}-y_{\sigma(i)})^2} - c\times\tau_{\sigma(i)}\right)^2 \quad (2)$$

in which:
$\hat{p}=[\hat{x},\hat{y}]$ represents the approximate position of the terminal;
$\sigma$ represents a mapping between the transmitters in the list {Tx} and the measured pseudo-distances;

card{Tx} is the number of the transmitters in the list;
c is a constant representing the speed of light.

The approximate position of the terminal $\hat{p}$ can be obtained by other positioning means. It corresponds, for example, to a previous GPS estimation performed before entering into a building or an estimation on the basis of GSM or UMTS signals.

It is worth noting that, if the cost function $v(p_i,\hat{p},\sigma)$ is calculated for the right combination $\sigma_v$, when the approximate position of the terminal is equal to its real position, that is to say, when $\hat{p}=p$, and assuming that the pseudo-distances are estimated without error, the cost has the value $v(\rho_i,\hat{p},\sigma)=0$.

The estimation of the best transmitters-measurements combination a amounts to a problem of minimizing the cost function $v(\rho_i,\hat{p},\sigma)$ such that:

$$\hat{\sigma} = \arg\min_\sigma [v(p_i, \hat{p}, \sigma)] \quad (3)$$

in which expression:

$$\arg\min_k ( )$$

is a function indicating that the search for the minimum is done only on the variable k.

FIG. 2 gives a simple example of application of the method according to the invention when there is no estimation error. In this example, two transmitters Tx1 and Tx2 belonging to a single-frequency network are visible to a receiving terminal 201. The first transmitter Tx1 is at a distance $d_1$ from the terminal and the second transmitter is at a distance $d_2$ from the terminal.

In this example, it is assumed that the estimated position of the terminal is equal to the true position, that is to say $\hat{p}=p$. It is also assumed that the pseudo-distance measurements $\rho_1$ and $\rho_2$ are obtained without estimation error.

In this example, there are two combinations of transmitters called $\sigma_1$ and $\sigma_2$ to be tested:

$\sigma_1$ corresponds to the combination: transmitter Tx1 associated with the measured pseudo-distance $\rho_1$ and transmitter Tx2 associated with the measured pseudo-distance $\rho_2$.

$\sigma_2$ corresponds to the combination: transmitter Tx2 associated with the measured pseudo-distance $\rho_1$ and transmitter Tx1 associated with the measured pseudo-distance $\rho_2$.

By taking the following values:
$d_1$=500 m, $d_2$=200,
positions of the transmitters: $x_1$=−400, $x_2$=200, $y_1$=$y_2$=0,
real position of the terminal: x=y=0 m,
estimated position of the terminal $\hat{x}$=0 m and $\hat{y}$=0 m because $\hat{p}=p$,
$c\times\tau_1$=100 and $c\times\tau_2$=0,
$\rho_1=d_2$ and $\rho_2=d_1$,
the following two costs are then obtained, determined by using the cost function as defined by the expression (2):

$$v(\rho_i,p,\sigma_1)=180000 \text{ and } v(\rho_i,p,\sigma_2)=0 \quad (4)$$

The cost function is minimized by the combination $\sigma_2$, the pseudo-distance measurements are then unambiguously associated with the different transmitters of the single-frequency network. It is then possible to accurately determine the position of the terminal.

It can be noted that it is possible to use the identification of the transmitters in a single-frequency network for a purpose other than that of positioning the terminals. As an example, this identification can be used in the context of intra-system interference monitoring in a single-frequency network with artificial delays. This thus makes it possible to determine which transmitter is scrambling TV reception in a given area.

FIG. 3 gives a simple example of application of the method according to the invention in the presence of estimation errors.

In this example, two transmitters Tx1 and Tx2 belonging to a single-frequency network are visible to a receiving terminal 301. The first transmitter Tx1 is at a distance $d'_1$ from the terminal and the second transmitter is at a distance $d'_2$ from the terminal.

The estimated position of the terminal 302 is not exact and is different from the true position, that is to say, $\hat{p}\neq p$. It is also assumed that the pseudo-distance measurements $\rho_1$ and $\rho_2$ are obtained with estimation errors.

As in the example of FIG. 2, there are two combinations of transmitters $\sigma_1$ and $\sigma_2$ to be tested:

$\sigma_1$ corresponds to the combination: transmitter Tx1 associated with the measured pseudo-distance $\rho_1$ and transmitter Tx2 associated with the measured pseudo-distance $\rho_2$.

$\sigma_2$ corresponds to the combination: transmitter Tx2 associated with the measured pseudo-distance $\rho_1$ and transmitter Tx1 associated with the measured pseudo-distance $\rho_2$.

By taking the following values:
$d_1$=500 m, $d_2$=200 m,
positions of the transmitters: $x_1$=−400, $x_2$=200, $y_1$=$y_2$=0,
real position of the terminal: x=y=0 m,
estimated position of the terminal $\hat{x}$=20 m, $\hat{y}$=0 m,
$c\times\tau_1$=100 and $c\times\tau_2$=0,
$\rho_1$=220 m and $\rho_2$=530 m
the two costs are then obtained, determined by using the cost function of the expression (2):

$$v(\rho_i,p,\sigma_1)=212500 \text{ and } v(\rho_i,p,\sigma_2)=1700 \quad (5)$$

Despite the estimation errors, the cost function is minimized for the combination $\sigma_2$.

As an example, it is possible to estimate the performance of this method by calculating the difference between the second lowest cost value and the lowest cost value, that is to say, the one corresponding to the combination retained. When this difference is maximized, this means that the transmitters-measurements combinations are identified with a low error rate. This difference is maximized when the artificial delays are chosen so as to reject the areas of ambiguity outside the coverage of the transmitters. In other words, the introduction of artificial delays renders the signature of the measurements of the receiver unique relative to a possible position.

Advantageously, this method is robust even when the assistance data are of mediocre quality, as, for example, when the approximate position of the receivers includes an error of the order of a hundred or so meters.

We claim:

1. A method, carried out by a telecommunication receiver, for identifying a more probable mapping $\hat{\sigma}$ between measured pseudo-distances $\rho_i$ and transmitters in a plurality of transmitters belonging to a single-frequency network, said transmitters being synchronized and transmitting with an artificial delay $\tau_i$, specific to each transmitter, a same radiofrequency signal on one and the same carrier frequency, the method comprising:

acquiring, by the telecommunication receiver, as assistance data, an approximate position of the telecommunication receiver $\hat{p}$, and a list of transmitters {Tx} located in a vicinity of the telecommunication receiver with respective positions $p_i$ and delays $\tau_i$, i being an integer index for identifying the transmitters ranging from 1 to a cardinal of the list;

receiving at the telecommunication receiver radiofrequency signals corresponding to the radiofrequency signals transmitted by the transmitters and measuring, at the telecommunication receiver, pseudo-distances $\rho_i$ between the transmitters and the telecommunication terminal; and determining at the telecommunication receiver, a more probable mapping $\hat{\sigma}$ between the measured pseudo-distances $\rho_i$ and the transmitters of known positions $p_{\hat{\sigma}(i)}$ by minimizing a cost function $v(\rho_i,\hat{p},\sigma)$ over a set of all mappings $\sigma$ between the measured pseudo-distances $\rho_i$ and the transmitters, said cost function $v(\rho,\hat{p},\sigma)$ being equal to a powered norm of an error vector defined as a difference between a first vector of the measured pseudo-distances $\rho_i$ and a second vector of calculated pseudo-distances model functions depending from the assistance data and the mapping $\sigma$.

2. The method according to claim 1, further comprising:
estimating a refined position of the telecommunication receiver by using the positions of the transmitters and the pseudo-distances associated with the transmitters by optimizing the mapping $\sigma$ to yield an optimized mapping $\hat{\sigma}$.

3. The method according to claim 1, wherein the positions $p_i$ and the artificial delays $\tau_i$ of the transmitters are stored in a database located in the terminal.

4. The method according to claim 1, wherein the positions $p_i$ and the delays $\tau_i$ of the transmitters are transmitted to the telecommunication receiver by using telecommunication means.

5. The method according to claim 1, wherein the acquiring of the approximate position $\hat{p}$ of the telecommunication receiver is a result of estimations performed on mobile radio telecommunication systems.

6. The method according to claim 1, wherein the approximate position of the telecommunication receiver corresponds to a position acquired by a Global Positioning System (GPS).

7. The method according to claim 1, wherein the cost function corresponds to the following expression:

$$v(p_i, \hat{p}, \sigma) = \sum_{i=1}^{card(T_x)} \left(\rho_i - \sqrt{(\hat{x} - x_{\sigma(i)})^2 + (\hat{y} - y_{\sigma(i)})^2} - c \times \tau_{\sigma(i)}\right)^2$$

in which:
$\rho_i$ represents the ith measurement of pseudo-distances;
$\hat{p}=[\hat{x},\hat{y}]$ represents the approximate position of the terminal;
$\sigma$ represents a mapping between the transmitters in the list $\{Tx\}$ and the measured pseudo-distances;
card$\{Tx\}$ is the number of the transmitters in the list;
c is a constant representing the speed of light;
$\tau_i$ corresponds to the artificial delay associated with the ith transmitter.

8. The method according to claim 1, wherein a more probable mapping $\hat{\sigma}$ between the measured pseudo-distances $\rho_i$ and the transmitters of known positions $p_{\hat{\sigma}(i)}$ is determined according to the expression:

$$\hat{\sigma} = \arg_{\sigma} \min[v(p, \hat{p}, \sigma)]$$

in which:

$$\arg_{k} \min(\ )$$

is a function indicating that a search for a minimum is done only on a variable k.

9. A telecommunication receiver comprising a front end for receiving signals transmitted by transmitters in a plurality of transmitters of a single-frequency network, the transmitters being synchronized and transmitting with an artificial delay $\tau_i$, specific to each transmitter, a same radiofrequency signal on one and the same carrier frequency, wherein the telecommunication receiver comprises a processor configured to:
identify a more probable mapping $\hat{\sigma}$ between measured pseudo-distances $\rho_i$ and the transmitters;
acquire, by the telecommunication receiver, as assistance data, an approximate position of the telecommunication receiver $\hat{p}$, and a list of transmitters $\{Tx\}$ located in a vicinity of the telecommunication receiver with respective positions $p_i$ and delays $\tau_i$, i being an integer index for identifying the transmitters ranging from 1 to a cardinal of the list;
receive at the telecommunication receiver radiofrequency signals corresponding to the radiofrequency signals transmitted by the transmitters and measure, at the telecommunication receiver, pseudo-distances $\rho_i$ between the transmitters and the telecommunication terminal; and
determine at the telecommunication receiver, a more probable mapping $\hat{\sigma}$ between the measured pseudo-distances $\rho_i$ and the transmitters of known positions $p_{\hat{\sigma}(i)}$ by minimizing a cost function $\sigma(\rho_i,\hat{p},\sigma)$ over a set of all mappings $\sigma$ between the measured pseudo-distances $\rho_i$ and the transmitters, said cost function $v(\rho_i,\hat{p},\sigma)$ being equal to a powered norm of an error vector defined as a difference between a first vector of the measured pseudo-distances $\rho_i$ and a second vector of calculated pseudo-distances model functions depending from the assistance data and the mapping $\sigma$.

10. The telecommunication receiver according to claim 9, wherein the acquiring of the approximate position $\hat{p}$ of the telecommunication receiver is a result of estimations performed on Global System for Mobile Telecommunications (GSM) or Universal Mobile Telecommunication System (UMTS).

11. The method according to claim 1, wherein the acquiring of the approximate position $\hat{p}$ of the telecommunication receiver is a result of estimations performed on Global System for Mobile Telecommunications (GSM) or Universal Mobile Telecommunication System (UMTS).

* * * * *

UNITED STATES PATENT AND TRADEMARK OFFICE
CERTIFICATE OF CORRECTION

PATENT NO. : 9,030,357 B2
APPLICATION NO. : 13/268540
DATED : May 12, 2015
INVENTOR(S) : Paul Thevenon et al.

Page 1 of 1

It is certified that error appears in the above-identified patent and that said Letters Patent is hereby corrected as shown below:

In the claims:

In line 26 of claim 9, please replace "the cost function $\sigma(\rho_i, \hat{p}, \sigma)$," with --the cost function $v(\rho_i, \hat{p}, \sigma)$ --.

Signed and Sealed this
Eighth Day of September, 2015

Michelle K. Lee
*Director of the United States Patent and Trademark Office*